US009759612B2

United States Patent
Song (10) Patent No.: US 9,759,612 B2
(45) Date of Patent: Sep. 12, 2017

(54) WELDING PORTION INSPECTION SYSTEM AND THE CONTROL METHOD OF INSPECTION SYSTEM

(71) Applicant: Hyundai Motor Company, Seoul (KR)

(72) Inventor: Jae Hun Song, Seoul (KR)

(73) Assignee: Hyundai Motor Company, Seoul (KR)

( * ) Notice: Subject to any disclaimer, the term of this patent is extended or adjusted under 35 U.S.C. 154(b) by 302 days.

(21) Appl. No.: 14/523,509

(22) Filed: Oct. 24, 2014

(65) Prior Publication Data

US 2015/0346033 A1 Dec. 3, 2015

(30) Foreign Application Priority Data

May 29, 2014 (KR) ........................ 10-2014-0065261

(51) Int. Cl.
| | |
|---|---|
| *B23K 11/11* | (2006.01) |
| *G01J 5/00* | (2006.01) |
| *B23K 11/25* | (2006.01) |
| *B23K 11/30* | (2006.01) |
| *B23K 11/31* | (2006.01) |
| *B23K 101/00* | (2006.01) |
| *B23K 101/18* | (2006.01) |

(52) U.S. Cl.
CPC .............. *G01J 5/0018* (2013.01); *B23K 11/11* (2013.01); *B23K 11/252* (2013.01); *B23K 11/3009* (2013.01); *B23K 11/314* (2013.01); *B23K 2201/006* (2013.01); *B23K 2201/18* (2013.01); *G01J 2005/0077* (2013.01)

(58) Field of Classification Search
USPC .................................. 219/78.01, 86.33, 86.9
See application file for complete search history.

(56) References Cited

U.S. PATENT DOCUMENTS

| | | | | |
|---|---|---|---|---|
| 2,658,162 A | * | 11/1953 | Tichenor ............ | B23K 9/0017 219/76.14 |
| 2,979,599 A | * | 4/1961 | Width ................. | B23K 11/312 219/158 |
| 4,877,940 A | * | 10/1989 | Bangs ................. | B23Q 35/127 219/124.34 |
| 5,285,043 A | * | 2/1994 | Smith ................. | B23K 11/312 219/87 |
| 5,541,382 A | * | 7/1996 | Taylor ................ | B23K 11/31 219/117.1 |
| 6,172,333 B1 | * | 1/2001 | Stava ................. | B23K 9/1735 219/130.1 |

(Continued)

FOREIGN PATENT DOCUMENTS

| | | |
|---|---|---|
| JP | 2011-007712 A | 1/2011 |
| KR | 10-2009-0093000 A | 9/2009 |
| KR | 10-2010-0012241 A | 2/2010 |

*Primary Examiner* — Dana Ross
*Assistant Examiner* — Renee Larose
(74) *Attorney, Agent, or Firm* — Mintz Levin Cohn Ferris Glovsky and Popeo, P.C.; Peter F. Corless (57) ABSTRACT

A welding portion inspection system includes a sensing head, and first and second electrodes that are disposed a predetermined distance from each other at one side of the sensing head, where front end portions of the first and second electrodes contact both sides of a welding portion to apply current such that a temperature of the welding portion is heated, and an infrared camera is disposed on the sensing head and detects a temperature distribution of the welding portion.

10 Claims, 10 Drawing Sheets

(56) References Cited

U.S. PATENT DOCUMENTS

| | | | | |
|---|---|---|---|---|
| 7,009,135 B1* | 3/2006 | Cheah | ............... | B23K 11/312 |
| | | | | 219/86.33 |
| 7,974,737 B2* | 7/2011 | Tilove | ............... | B25J 9/1666 |
| | | | | 700/253 |
| 2003/0062355 A1* | 4/2003 | Ikegami | ............... | B23K 9/0017 |
| | | | | 219/137 PS |
| 2007/0090096 A1* | 4/2007 | Lechler | ............... | B23K 11/315 |
| | | | | 219/86.32 |
| 2008/0237197 A1* | 10/2008 | Saito | ............... | B23K 11/061 |
| | | | | 219/78.01 |
| 2008/0290073 A1* | 11/2008 | Wood | ............... | B23K 11/25 |
| | | | | 219/117.1 |

* cited by examiner

WELDING PORTION INSPECTION SYSTEM AND THE CONTROL METHOD OF INSPECTION SYSTEM

CROSS-REFERENCE TO RELATED APPLICATION

This application claims under 35 U.S.C. §119(a) priority to and the benefit of Korean Patent Application No. 10-2014-0065261 filed in the Korean Intellectual Property Office on May 29, 2014, the entire contents of which are incorporated herein by reference.

BACKGROUND (a) Field of the Invention

The present invention is related to a welding portion inspection system that determines quality of a part in which two components are joined so as to improve quality of a product and overall durability.

(b) Description of the Related Art

Spot welding, arc welding, and laser welding often are used in a vehicle production process, and about 400 welding points are formed in a vehicle, where a subset of these welding points are inspected.

Demand for improved welding quality has increased in conjunction with a desire to improve vehicle body assemble quality, and an ultrasonic wave inspection device is used as a quality device after a vehicle body is welded.

A welding portion quality measuring device using ultrasonic wave includes an ultrasonic wave generator, a media, and a film, where the ultrasonic wave inspection method has to use liquid media that is applied on an inspection surface, and the inspection result of the ultrasonic wave device can be mapped in a graph having an X axis that is time and a Y axis that is strength of an ultrasonic wave.

Further, a heat method is used to apply heat to the welding portion, and an infrared camera is used to measure the radiated heat so as to measure the quality of the welding portion.

Methods for applying heat to the welding portion include those in which a high level of flash (light) is used to apply heat to the welding portion, and an eddy current is used to heat the welding portion. However, these methods have disadvantages that it is impossible to inspect the welding portion in a closed area and the inspection time is long.

The above information disclosed in this Background section is only for enhancement of understanding of the background of the invention and therefore it may contain information that does not form the prior art that is already known in this country to a person of ordinary skill in the art.

SUMMARY

The present invention has advantages of being able to inspect various types of welding portions and saving inspection time such that overall productivity is improved and cost is reduced.

A welding portion inspection system according to an exemplary embodiment of the present invention may include a sensing head, a first electrode and a second electrode that are disposed a predetermined distance from each other at one side of the sensing head, where front end portions of the first and second electrodes contact both sides of a welding portion to apply current such that a temperature of the welding portion is heated, and an infrared camera is disposed on the sensing head and detects a temperature distribution of the welding portion.

One of the first electrode and the second electrode may apply current to one side of the welding portion, and the other of the first and second electrodes applies current to the other side of the welding portion.

The first electrode or the second electrode may be movably disposed on the sensing head such that a distance between the first electrode and the second electrode is adjustable, and the infrared camera may be movably disposed corresponding to a position of the welding portion.

The welding portion inspection system may include a linear guide that respectively guides the movement of the first electrode, the second electrode, or the infrared camera on the sensing head, and a driving portion that is configured to move the first electrode, the second electrode, or the infrared camera along the linear guide.

The welding portion inspection system may include an elastic member that elastically pushes the first electrode or the second electrode toward a surface of the welding portion, and the first electrode or the second electrode may be disposed on the sensing head to be able to compress or decompress the elastic member depending on the surface height of the welding portion.

The welding portion inspection system may include a robot that is configured to move a robot control portion to a predetermined position near the welding portion, an inspection device control portion that controls current/voltage that is supplied to the first electrode and the second electrode and controls the infrared camera, and a display portion that displays an infrared image that is detected by the infrared camera.

The electrode control portion may apply power to the first electrode and the second electrode such that a temperature of the welding portion reaches a predetermined temperature range, and the inspection device control portion may take an infrared image of the welding portion through the infrared camera after a predetermined time elapses from a point that the power is applied to the first electrode and the second electrode.

The welding portion inspection system may include an image analyzer that analyzes the infrared image that is detected by the infrared camera.

The welding portion inspection system may include an electrode guide that is disposed on the sensing head, and a rear end portion of the first electrode or the second electrode is inserted into the electro guide, wherein the elastic member is disposed in the electrode guide and elastically pushes the first electrode or the second electrode.

The welding portion inspection system may include a case that is disposed on the sensing head and is configured to reduce light infiltration to the infrared camera.

A control method of a welding portion inspection system according to an exemplary embodiment of the present invention may include making a first electrode and a second electrode contact one side and the other side of a welding portion, applying current such that the current flow the first electrode, the welding portion, and the second electrode, obtaining an infrared image of a shooting range including the welding portion, and determining a condition of the welding portion by analyzing the infrared image.

The control method of a welding portion inspection system may include adjusting a distance between the first electrode and the second electrode corresponding to the welding portion, and adjusting a position of the infrared camera corresponding to the welding portion, in the step of obtaining the infrared image.

The first electrode and the second electrode may elastically contact a surface of a panel having the welding portion through an elastic member.

In accordance with the present invention, a first electrode and a second electrode are used to apply current on a welding portion such that a heating time is reduced and quality of the welding portion can be quickly determined.

Further, an infrared camera is mounted on a sensing head such that the heating and the image detection are simultaneously performed and the quality of the welding portion is accurately determined.

In addition, an elastic member is used to elastically push the electrode, wherein the electrode can be inserted or drawn out by a step portion such that the electrode can be applied to various types of the welding portion.

DETAILED DESCRIPTION OF THE EMBODIMENTS

An exemplary embodiment of the present invention will hereinafter be described in detail with reference to the accompanying drawings.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

Further, the control logic of the present invention may be embodied as non-transitory computer readable media on a computer readable medium containing executable program instructions executed by a processor, controller or the like. Examples of computer readable media include, but are not limited to, ROM, RAM, compact disc (CD)-ROMs, magnetic tapes, floppy disks, flash drives, smart cards and optical data storage devices. The computer readable medium can also be distributed in network coupled computer systems so that the computer readable media is stored and executed in a distributed fashion, e.g., by a telematics server or a Controller Area Network (CAN).

Figure 1:
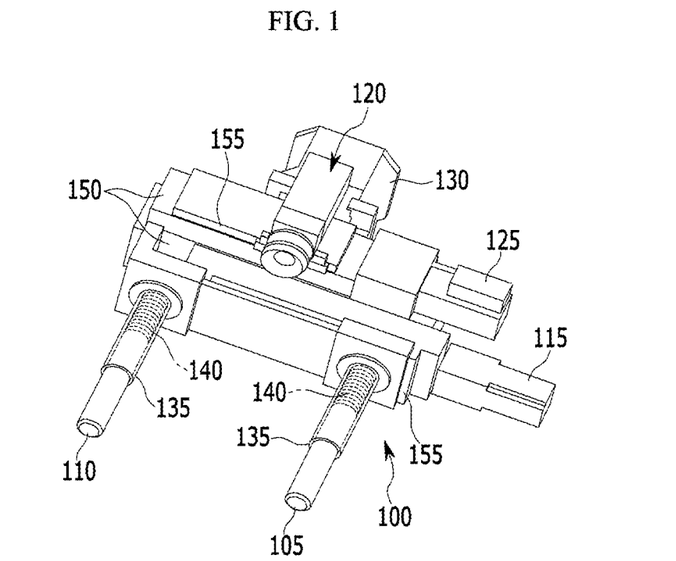
FIG. 1 is a perspective view showing a welding portion inspection device according to an exemplary embodiment of the present invention.

FIG. 1 is a perspective view showing a welding portion inspection device according to an exemplary embodiment of the present invention.

Referring to FIG. 1, a welding portion inspection device includes a sensing head 150, a first electrode 105, a second electrode 110, an infrared camera 120, an electrode guide 135, an elastic member 140, an electrode transfer motor 115, a camera transfer motor 125, and a bracket 130.

The first electrode 105 and the second electrode 110 are disposed on a lower side of the sensing head 150 by a predetermined distance from each other, and the first electrode 105 and the second electrode 110 are inserted into the electrode guide 135 having a pipe shape.

The elastic member 140 has a configuration that elastically pushes the first electrode 105 and the second electrode 110 in the electrode guide 135.

The second electrode 110, the electrode guide 135, and the elastic member 140 are disposed to be able to move along the linear guide 155 by the electrode transfer motor 115.

The infrared camera 120 is disposed at a side surface of the sensing head 150 between the first electrode 105 and the second electrode 110. The infrared camera 120 is disposed to be able to reciprocate along the linear guide 155 by the camera transfer motor 125.

The bracket 130 is fixed on an upper central portion of the sensing head 150, and the bracket 130 is fixed on a robot arm 200. The welding portion inspection device 100 can move toward a predetermined welding portion 230 of a vehicle body by a robot 910.

Figure 2:
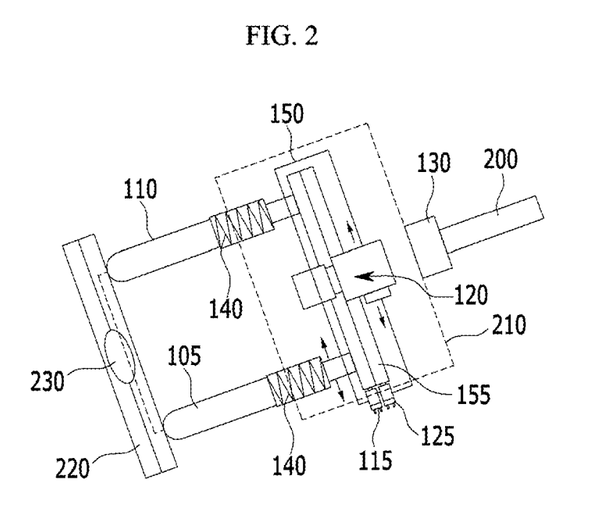
FIG. 2 is a schematic side view of the welding portion inspection device of FIG. 1.

FIG. 2 is a schematic side view of the welding portion inspection device according to the exemplary embodiment of the present invention.

Referring to FIG. 2, each front end portion of the first electrode 105 and the second electrode 110 of the welding portion inspection device 100 contacts the welding portion 230 of the panel 220 that is welded.

The first electrode 105 contacts one side edge surface of the welding portion 230, and the second electrode 110 contacts the other side edge surface of the welding portion 230. Current (via a voltage) is applied through the first electrode 105, the panel 220, the welding portion 230, and the second electrode 110.

While the power is being applied, the welding portion 230 and the surroundings are heated, and the infrared camera 120 detects an infrared image of the welding portion 230 and the surroundings.

A case 210 is disposed around the infrared camera 120 to cover outside light and the case 210 improves detection efficiency and accuracy of the infrared camera 120.

Figure 3:
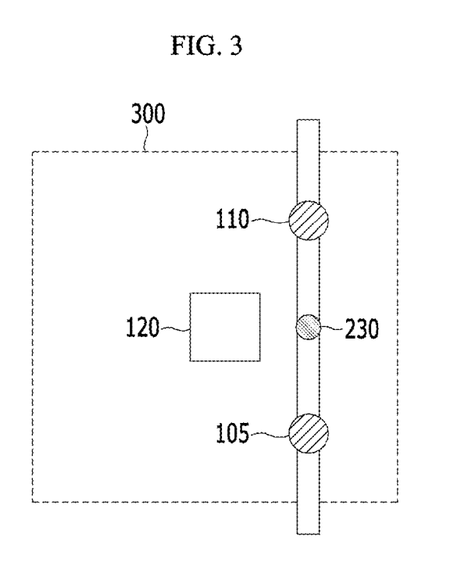
FIG. 3 is a schematic top plan view showing a position of an infrared camera and an electrode on the welding portion inspection device according to the exemplary embodiment of the present invention.

FIG. 3 is a schematic top plan view showing a position of an infrared camera and an electrode on the welding portion inspection device according to the exemplary embodiment of the present invention.

Referring to FIG. 3, the first electrode 105, the welding portion 230, and the second electrode 110 are sequentially disposed, the infrared camera 120 is disposed at one side of the welding portion 230 to form a shooting range 30 including the welding portion 230, and the first electrode 105, the second electrode 110, and the welding portion 230 are all included in the shooting range 300.

Figure 4:
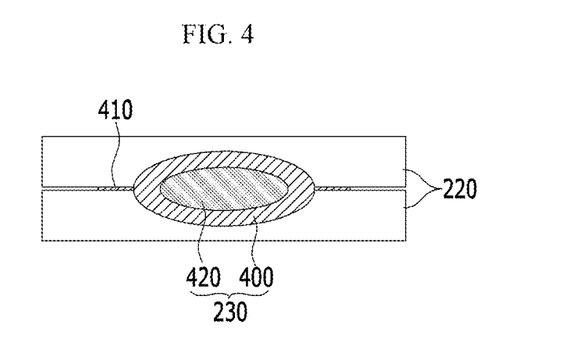
FIG. 4 is a cross-sectional view showing a heat distribution of a welding portion according to the exemplary embodiment of the present invention.
Figure 5:
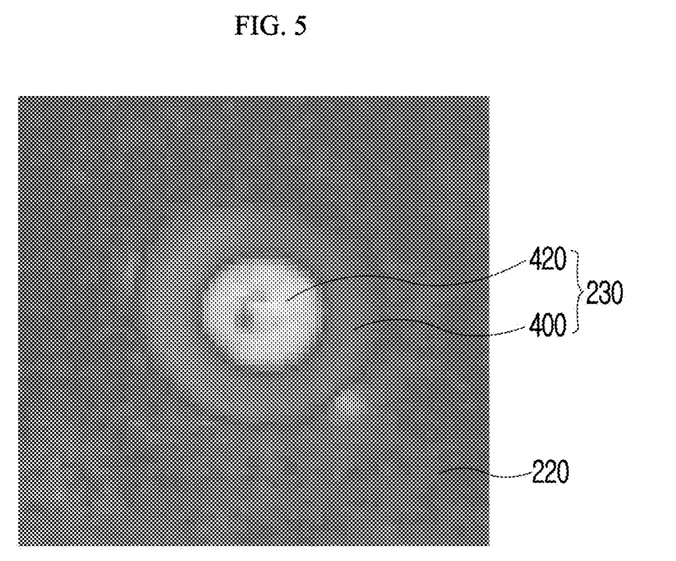
FIG. 5 shows an infrared image of a welding portion detected by an infrared camera of the welding portion inspection device according to the exemplary embodiment of the present invention.

FIG. 4 is a cross-sectional view showing a heat distribution of a welding portion according to an exemplary embodiment of the present invention, and FIG. 5 shows an infrared image of a welding portion that an infrared camera of the welding portion inspection device detects according to the exemplary embodiment of the present invention.

Referring to FIGS. 4 and 5, an upper panel and a lower panel (each panel is denoted by reference number 220) of a vehicle body are welded, and a welding portion 230 is formed. The welding portion 230 includes a nugget 420 that is formed in a central portion, a heat affected portion 400 around the nugget 420, and a corona bond 410 between the heat affected portion 400 and the panel 220, and while the panel 220 is being welded, a temperature difference is formed by an electric resistance difference and their boundary can be effectively detected.

When a high power flash or an ultrasonic wave is used to heat the welding portion 230, it is hard to detect a temperature difference between them, and it is hard to determine a condition of the welding portion 230.

However, electrodes are used to apply current through the welding portion 230 to heat the welding portion 230, and the condition of the welding portion 230 can be efficiently determined through the temperature difference that is formed by an electrical resistance difference.

Figure 6:
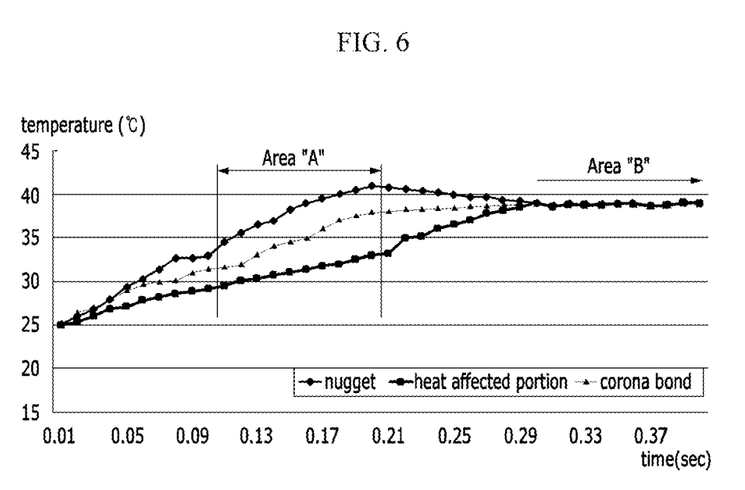
FIG. 6 is a graph showing a temperature distribution according to a position of a welding portion according to the exemplary embodiment of the present invention.

FIG. 6 is a graph showing a temperature distribution according to a position of a welding portion according to the exemplary embodiment of the present invention.

Referring to FIG. 6, a horizontal axis denotes time, and a vertical axis denotes temperature.

Current is applied to the welding portion 230 through the first electrode 105 and the second electrode 110, and temperature of the nugget 420, the heat affected portion 400, and the corona bond portion 410 are increased.

More particularly, the temperature of the nugget 420 is highest during a "A" heating area, the temperature of the heat affected portion 400 is lower than that of the nugget 420, and the temperature of the corona bond portion 410 is lower than that of the heat affected portion 400.

And, if the current supply toward the welding portion 230 is halted in a "B" area, temperature of the nugget 420, the heat affected portion 400, and the corona bond portion 410 converges on one temperature value.

In an exemplary embodiment of the present invention, while the first electrode 105 and the second electrode 110 apply current to the welding portion 230, temperature difference is formed between the nugget 420, heat affected portion 400, and corona bond portion 410, and the infrared camera detects image of the welding portion.

Figure 7:
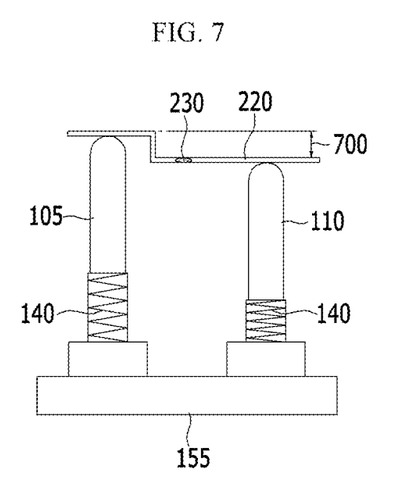
FIG. 7 is a schematic side view showing a condition in which the welding portion inspection device is applied to a step according to the exemplary embodiment of the present invention.

FIG. 7 is a schematic side view showing a condition that a welding portion inspection device is applied to a step according to the exemplary embodiment of the present invention.

Referring to FIG. 7, a step 700 having a height difference is formed on the panel 220 that the welding portion 230 is formed, and the first electrode 105 and the second electrode 110 each have a structure absorbing the height difference through the elastic member 140, and this configuration can be applied to the welding portion 230 having a different height of the step 700.

Figure 8:
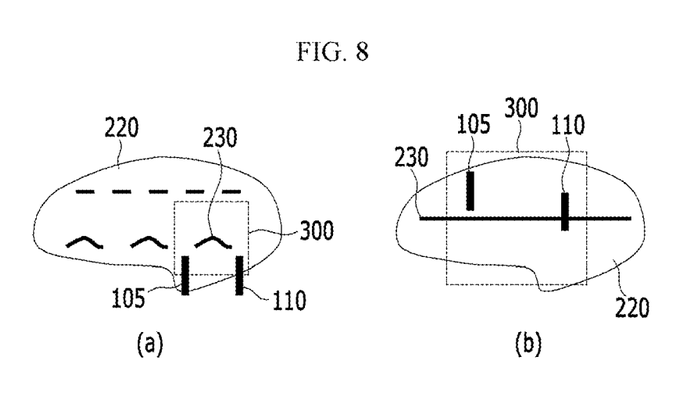
FIG. 8 shows a condition that a welding portion inspection device is applied depending on characteristic of a welding portion according to the exemplary embodiment of the present invention.

FIG. 8 shows a condition that a welding portion inspection device is applied depending on characteristic of a welding portion according to the exemplary embodiment of the present invention.

Referring to FIG. 8(a), when the length of the welding portion 230 is relatively short, the first electrode 105 and the second electrode 110 are disposed at both sides of the welding portion 230 such that the current flows all the welding portion 230.

Referring to FIG. 8(b), when the length of welding portion 230 is respectively long, the first electrode 105 and the second electrode 110 are disposed at both sides across the welding portion 230 such that the current is applied to the welding portion 230.

Figure 9:
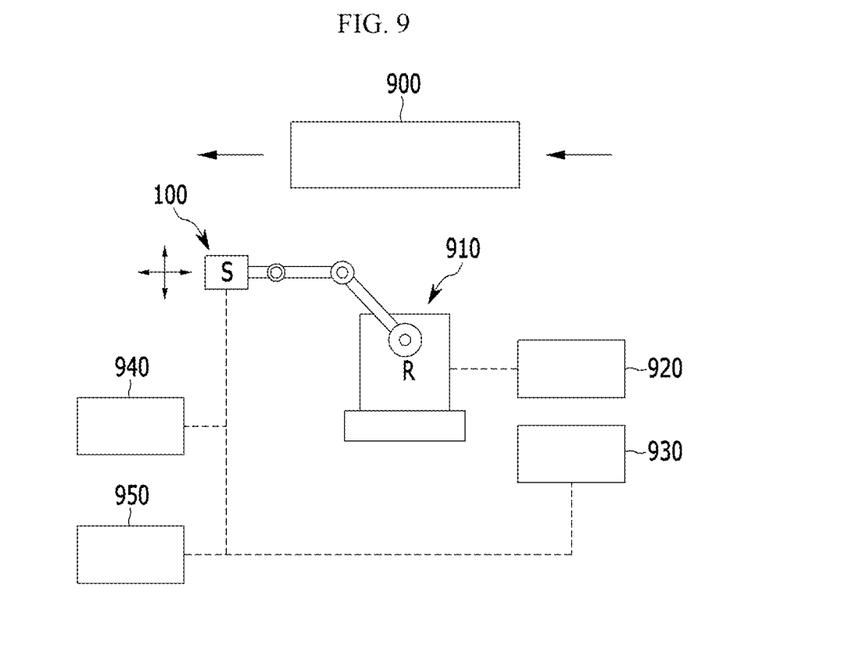
FIG. 9 is a schematic diagram showing a welding portion inspection system according to an exemplary embodiment of the present invention.

FIG. 9 is a schematic diagram showing a welding portion inspection system according to an exemplary embodiment of the present invention.

Referring to FIG. 9, a welding portion inspection system includes a welding portion inspection device 100 for checking the welding portion 230 of a vehicle body 900, a robot 910 that is configured to move the device 100 to a predetermined position of the vehicle body 900, a robot control portion 920 that is configured to control the robot 910, an inspection device control portion 930 that supplies the first electrode 105 and the second electrode 110 of the device 100 with power and controls the infrared camera 120, a display portion 940 that displays image that is detected by the infrared camera 120 and the result thereof, and an image analyzer 950 that shows images that is detected by the infrared camera 120, analyzes the image, and outputs the results of the condition of the welding portion 230.

Figure 10:
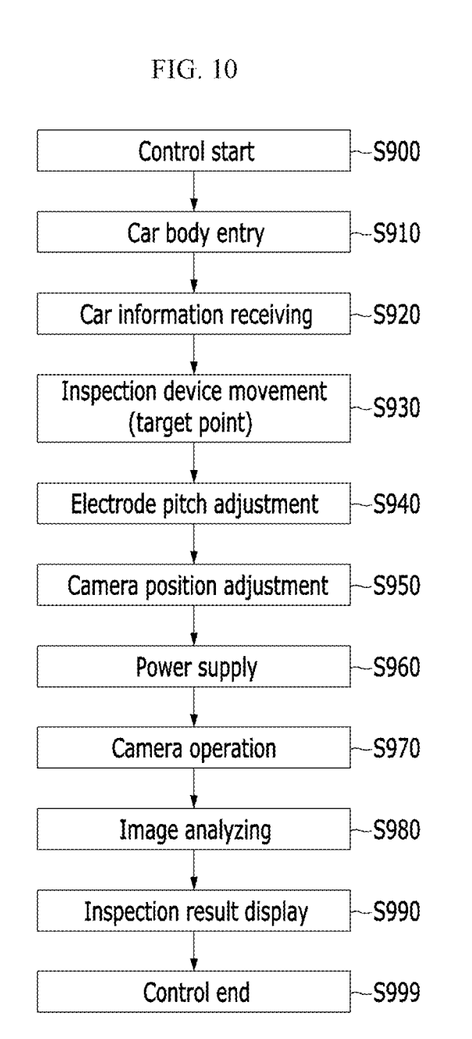
FIG. 10 is a flowchart showing a control method of a welding portion inspection system according to an exemplary embodiment of the present invention.

FIG. 10 is a flowchart showing a control method of a welding portion inspection system according to the exemplary embodiment of the present invention.

Referring to FIG. 10, a control starts at step S900, and a vehicle or a vehicle body is entered at step S910. Information of a vehicle (or vehicle body) is received at step S920, and a welding portion inspection device 100 is moved to a predetermined target point by a robot control portion 920 at step S930.

And, the inspection device control portion 930 adjusts a pitch (distance) of the first electrode 105 and the second electrode 110 at step S940, a position of the infrared camera 120 is adjusted at step S950, and current is supplied to the welding portion 230 through the first electrode 105 and the second electrode 110 at step S960.

After a predetermined time elapses, the current supply is halted, the inspection device control portion 930 operates the infrared camera 120 and gains the infrared image at step S970.

The image analyzer 950 analyzes the infrared image at step S980, and the display portion 940 shows the condition of the welding portion together with the infrared image at step S990. And, a control ends at step S999.

A robot control portion 920, an inspection device control portion 930, an image analyzer 950 and the display portion 940 according to an exemplary embodiment of the present invention can be may include one or more microprocessors operating with a predetermined program including instructions for a method according to an exemplary embodiment of the present invention.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. A welding portion inspection system, comprising:
a sensing head;
a first electrode and a second electrode that are disposed a predetermined distance from each other at one side of the sensing head, and front end portions of the first and second electrodes contact both sides of a welding portion to apply current such that a temperature of the welding portion is heated;
an infrared camera disposed on the sensing head, the infrared camera detecting a temperature distribution of the welding portion; and
an elastic member that elastically pushes the first electrode or the second electrode toward a surface of the welding portion, and the first electrode or the second electrode is disposed on the sensing head so as to compress or decompress the elastic member depending on a surface height of the welding portion,
wherein one of the first and second electrodes applies current to one side of the welding portion and the other of the first and second electrodes applies current to the other side of the welding portion.

2. The welding portion inspection system of claim 1, wherein the first electrode or the second electrode is movably disposed on the sensing head such that a distance between the first electrode and the second electrode is adjustable, and the infrared camera is movably disposed corresponding to a position of the welding portion.

3. The welding portion inspection system of claim 2, further comprising:
a linear guide that respectively guides the movement of the first electrode, the second electrode, or the infrared camera on the sensing head;
an electrode transfer motor configured to move the first electrode and the second electrode along the linear guide; and
a camera transfer motor configured to move the infrared camera along the linear guide.

4. The welding portion inspection system of claim 1, further comprising:

a robot that is configured to move a robot control portion to a predetermined position near the welding portion;
an inspection device control portion that controls current/voltage that is supplied to the first electrode and the second electrode and controls the infrared camera; and
a display portion that displays an infrared image that is detected by the infrared camera.

5. The welding portion inspection system of claim 4, wherein the electrode control portion applies power to the first electrode and the second electrode such that a temperature of the welding portion reaches a predetermined temperature range, and
the inspection device control portion takes the infrared image of the welding portion through the infrared camera after a predetermined time elapses from a point that the power is applied to the first electrode and the second electrode.

6. The welding portion inspection system of claim 4, further comprising an image analyzer that analyzes the infrared image that is detected by the infrared camera.

7. The welding portion inspection system of claim 1, further comprising an electrode guide that is disposed on the sensing head and a rear end portion of the first electrode or the second electrode is inserted into the electro guide,
wherein the elastic member is disposed in the electrode guide and elastically pushes the first electrode or the second electrode.

8. The welding portion inspection system of claim 1, further comprising a case that is disposed on the sensing head and is configured to reduce light infiltration to the infrared camera.

9. A control method of a welding portion inspection system, comprising:
making a first electrode and a second electrode contact one side and the other side of a welding portion;
applying current such that the current flows to the first electrode, the welding portion, and the second electrode;
obtaining an infrared image of a shooting range including the welding portion; and
determining a condition of the welding portion by analyzing the infrared image,
wherein the first electrode and the second electrode elastically contact a surface of a panel having the welding portion through an elastic member pushing the first electrode and the second electrode toward a surface of the welding portion.

10. The control method of a welding portion inspection system of claim 9, further comprising:
adjusting a distance between the first electrode and the second electrode corresponding to the welding portion; and
adjusting a position of the infrared camera corresponding to the welding portion, in the step of obtaining the infrared image.

* * * * *